United States Patent [19]
Rubner

[11] Patent Number: 5,232,303
[45] Date of Patent: Aug. 3, 1993

[54] CONNECTING ARRANGEMENT

[75] Inventor: Karl-Heinz Rubner, Göppingen, Fed. Rep. of Germany

[73] Assignee: Wilkhahn Wilkening + Hahne GmbH + Co., Fed. Rep. of Germany

[21] Appl. No.: 685,191

[22] Filed: Apr. 15, 1991

[30] Foreign Application Priority Data

May 22, 1990 [DE] Fed. Rep. of Germany ....... 4016486

[51] Int. Cl.$^5$ ............................................. F16B 12/44
[52] U.S. Cl. .................................. 403/330; 403/407.1; 403/322; 403/252; 248/223.2; 248/188
[58] Field of Search ............ 403/231, 330, 322, 405.1, 403/406.1, 407.1, 8, 239, 240, 321, 326, 252, 247; 248/188, 223.1, 223.2, 223.2, 188.1, 220.1, 220.2; 108/159, 64

[56] References Cited

U.S. PATENT DOCUMENTS

| | | | |
|---|---|---|---|
| 2,639,956 | 5/1953 | Jacobson | 403/321 X |
| 2,973,233 | 2/1961 | McPhee | 248/188 |
| 3,443,530 | 5/1969 | Carlson | 248/188 X |
| 4,458,872 | 7/1984 | Couch | 248/223.1 X |
| 4,632,594 | 12/1986 | Del Tufo et al. | 403/322 |
| 4,725,029 | 2/1988 | Herve | 248/223.1 |
| 5,035,186 | 7/1991 | Uredat et al. | 248/188 X |

FOREIGN PATENT DOCUMENTS

| | | | |
|---|---|---|---|
| 338180 | 11/1930 | United Kingdom | 403/403 |
| 2113802 | 8/1983 | United Kingdom | 403/1 |

*Primary Examiner*—Randolph A. Reese
*Assistant Examiner*—Harry C. Kim
*Attorney, Agent, or Firm*—Learman & McCulloch

[57] ABSTRACT

The invention relates to a connecting arrangement for a releasable and lockable connection between the upper end of a table leg and the underside of a table plate for assembly of a table. In this case a first connecting part provided with clamp bolts can be fixed on the upper end of the table leg and a second connecting part can be fixed on the underside of the table plate, this second connecting part having several bores and receiving holes adapted in size, number and distribution to the clamp bolts and containing an end plate with a clamp closure plate which is arranged flat above it and is rotatable relative thereto to engage the clamp bolts and firmly clamp the clamp bolts and attached table leg to the second connecting part and this connection can be released again. In this way a reliably stable and releasable connection is produced between table legs and at least one table plate with the possibility of assembling tables of any size from any number of table plates.

10 Claims, 3 Drawing Sheets

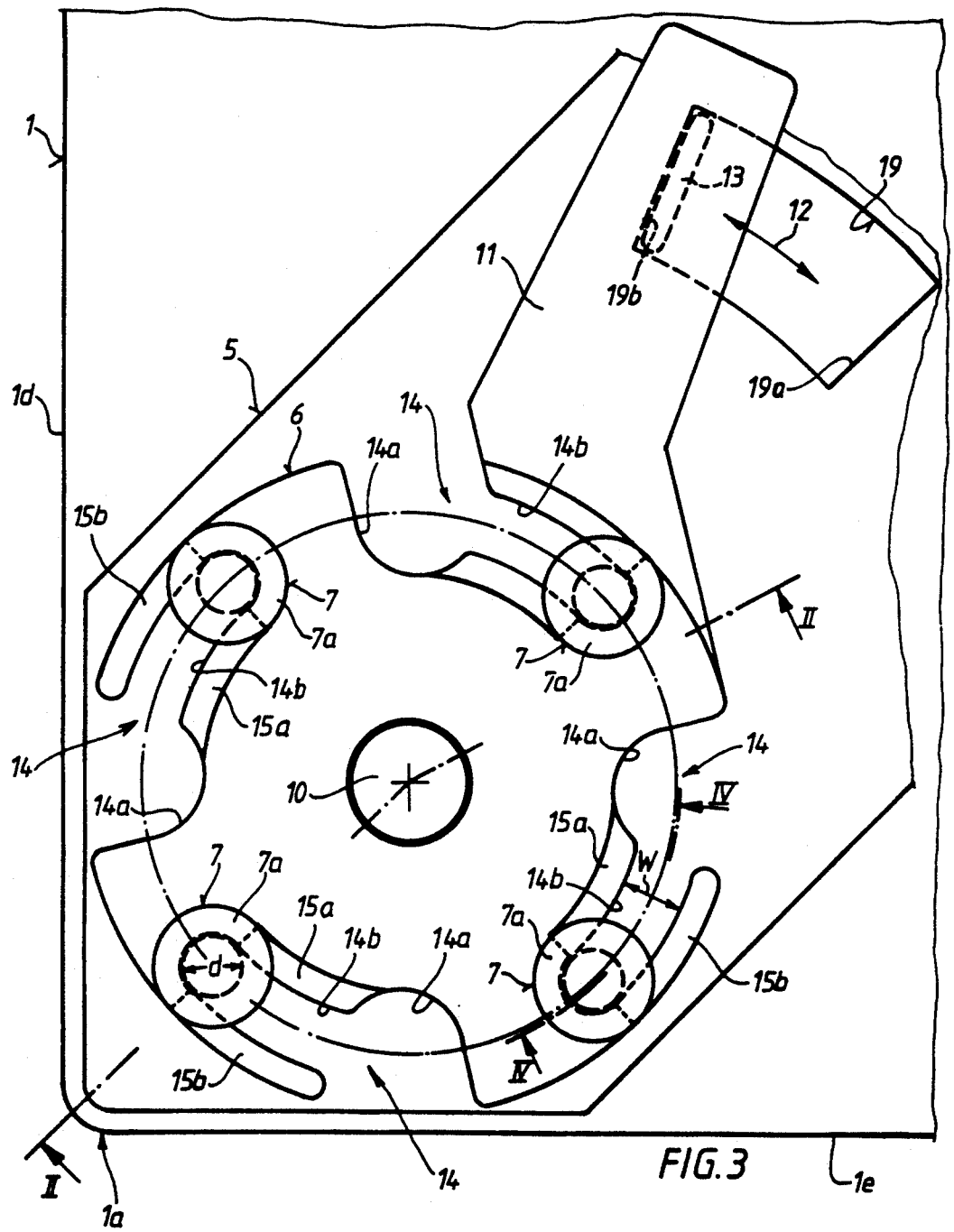
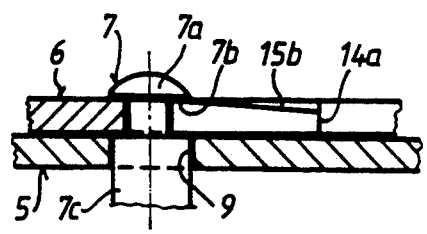
FIG. 3
FIG. 4

CONNECTING ARRANGEMENT

TECHNICAL FIELD

The invention relates to a connecting arrangement between the upper end of a table leg and at least one table plate for assembling a table.

BACKGROUND OF THE INVENTION

As is already well known in the art, tables can be assembled in such a way that the table legs are firmly connected, particularly by glueing, to a table frame by means of edge connections or the like and at least one appertaining table plate is attached to the table frame thus formed. It is also known in the art for the table legs to be screwed directly onto the underside of the table plates, if the table plates are sufficiently stable, using separate connecting arrangements. A connecting arrangement for the last mentioned case is known for example from DE Utility Model 87 12 124. Here the connecting arrangement is made in one piece and is in the shape of a truncated pyramid or cone, and has a vertical recess to receive the table leg as well as an upper supporting surface by means of which it can be screwed together with the table leg onto the underside of at least one table plate. If an individual table produced in this way is to be used to assemble a larger conference table, then with this known construction it is possible for the table legs in the region of abutting table plates to be arranged so that the supporting surfaces of their connecting arrangements are each screwed on with half of the surface under the adjacent opposing edge regions of two table plates.

SUMMARY OF THE INVENTION

The object of the invention is to provide a connecting arrangement for connecting the upper end of a table leg to at least one table top which in a relatively simple way permits an extremely rapid and stable connection of one table leg to at least one table plate as well as equally rapid release of this connection if required.

This object is achieved according to the invention by the plate attached to the table plate a table leg with a first connecting part and a releasable and lockable assembly for clamping the first connecting part to the end plate. Advantageous embodiments and further developments of this invention are set out in the subordinate claims.

For a releasable and lockable construction the connection arrangement according to the invention has a first connecting part which is fixed on the upper end face of a table leg and has several clamp bolts arranged symmetrically with respect to one another and projecting vertically upwards with heads constructed on their free ends, as well as a second connecting part which is to be arranged on the underside of a table plate and comprises an edge plate which can be fixed on the underside of the table plate as well as a clamp closure plate arranged flat (laminar) on this end plate, the clamp closure plate being capable of limited rotary movement relative to the end plate about a vertical axis between a first release position and a second locking position. The end plate has several bores which are adapted in their size, number and distribution to the clamp bolts and the clamp bolt heads, whilst the clamp closure plate has on its periphery several catch-like receiving holes provided in the region above the bores in the end plate. The construction, shape and co-ordination of the clamp bolts or clamp bolt heads of the first connecting part on the one hand and the bores of the end plate as well as the receiving holes of the clamp closure plate on the other hand are such that at least some clamp bolt heads of the first connecting part can be freely inserted through the bores into the receiving holes in the clamp closure plate and can be withdrawn when the clamp closure plate is in its release position, and the clamp bolt heads inserted into these receiving holes in the locking position of the clamp closure plate are gripped and locked by this latter, so that the first connecting part is firmly clamped to the second connecting part. Accordingly when the first connecting part is fixed on the upper end of a table leg and the second connecting part is correspondingly fixed on the underside of a table plate, then in this way a table leg can be clamped and connected extremely rapidly, stably and reliably to the underside of at least one table plate, and this connection can be released equally rapidly simply by a rotary movement of the clamp closure plate into its release position. In this case it goes without saying that for assembly of a complete table the necessary number of table legs arranged in appropriate distribution under at least one table plate in the manner described.

This connection arrangement according to the invention represents an extremely advantageous technical prerequisite for creating a table assembly with very many variations, that is to say a table can be assembled in the said manner both from one single table plate and also from several appropriately assembled—e.g. like a modular system—table plates with the necessary number of table legs. For this it is then convenient and particularly advantageous to provide table plates with a rectangular table plate, preferably according to a basic grid (e.g. 90×180 cm) which can be used in a modular manner and to arrange identical second connecting parts in all corner regions on the underside of each table plate in exactly the same way and with distance ratios relative to the respective table plate edges which are co-ordinated with each other and with the first connecting parts. The second connecting parts can generally be fixed in any suitable manner, preferably screwed, on the underside of the appertaining table plate, but it is particularly convenient and advantageous to build in these second connecting parts so that they are exactly flush and fit in grooves provided therefor.

If in this context, for example, a table is assembled from two table plates which butt flush against one another with their opposing edges and from several table legs to be arranged in the corner regions of the table plates, then it proves particularly advantageous to construct each connecting arrangement within the terms of the features of claim 12. In this way it will be generally sufficient if the rectangular sides of the two table plates which butt flush against one another are supported by only two table legs, each of which is arranged in two corner regions lying opposite one another, and then two clamps bolts of the first connecting part are clamped releasably in the second connecting part on the corner region of one table plate and the two other clamp bolts of this first connecting part are clamped releasably in the second connecting part on the corner region of the adjacent other table plate by one and the same table leg. Thus this connecting arrangement according to the invention then serves simultaneously on the one hand for a releasable, stable connection of each of the two table plates with this table leg and on the other hand for the equally releasable and stable connection of these table plates to each other.

The table assembled in the aforementioned manner with at least two table plates can then if required be converted in an extremely simple manner and very rapidly into a smaller table with only one single table plate, by first of all releasing the two table legs provided in the region of the connection of the two table plates and then co-ordinating them with the appertaining corner region of one table plate, so that then all four clamp bolts on the first connecting part of each table leg are received and clamped in the corresponding four bores and receiving holes.

The invention will be explained in greater detail below with the aid of the drawings, in which:

BRIEF DESCRIPTION OF THE DRAWINGS

FIG. 3 shows a top view of the second connecting part, approximately along the line III—III in FIG. 2;

FIG. 4 shows a sectional view of a detail along the line IV—IV in FIG. 3;

DESCRIPTION OF THE PREFERRED EMBODIMENT

Figure 1:
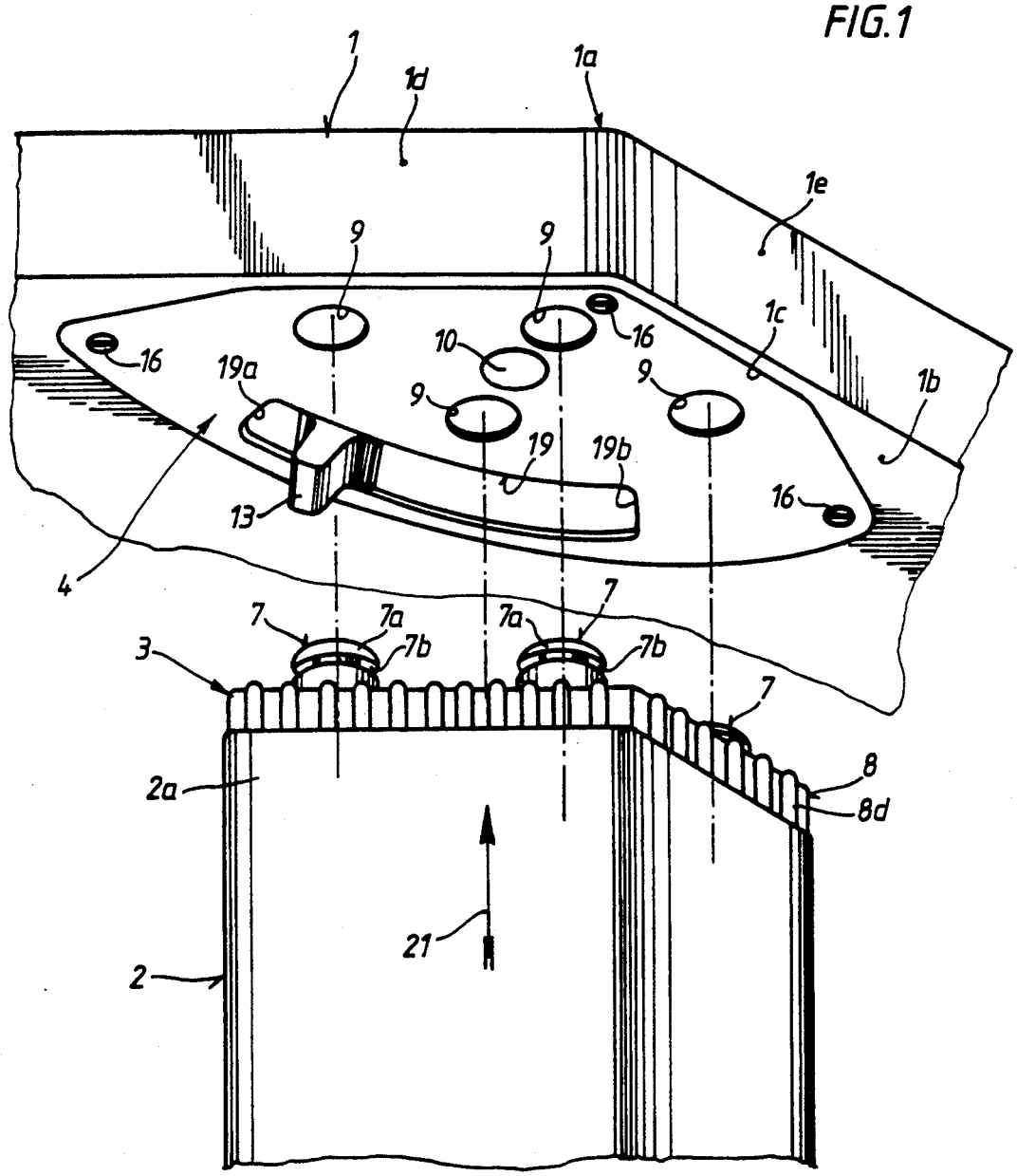
FIG. 1 shows an exploded perspective view of a lower corner region of a table, in which the connecting arrangement according to the invention between a table leg and the corner region of the table plate is shown in the released state.

The construction of a connecting arrangement according to the invention between a table leg and at least one table plate will be explained first of all in general with the aid of FIGS. 1 and 2. In this case it may be assumed that the table to be produced is assembled from a rectangular table plate 1 and four table legs which are to be arranged in each corner region 1a of this table plate, only one of these legs 2 being shown in the drawings with its upper end 2a. The two other corner regions 1a of the table plate 1 as well as the three other table legs 2 are of identical construction to those illustrated.

Figure 2:
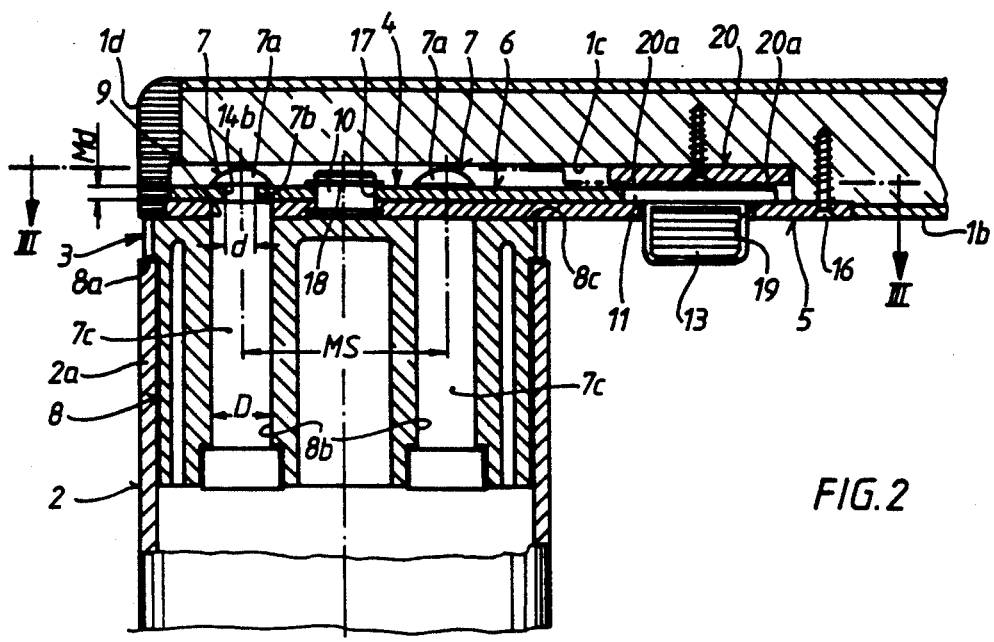
FIG. 2 shows a sectional view (approximately along the line II—II in FIG. 3) of a second connecting arrangement fixed on the underside of the table plate with a locked table leg.

According to FIGS. 1 and 2 the connecting arrangement according to the invention contains for its releasable and lockable construction a first connecting part 3 fixed on the upper end face 2a of the table leg 2 as well as a second connecting part 4 which is co-ordinated with the table plate 1 and contains an end plate 5 fixed on the underside 1b of this table plate 1 as well as a clamp closure plate 6 arranged flat or laminar on this end plate 5 (FIG. 2).

In general this second connecting part 4 could be simply attached to the level underside 1b of the table plate 1. However, for practical and optical reasons it is preferable to provide a groove in the corner region 1a on the underside 1b of this table plate 1 which corresponds to the dimensions of the second connecting part 4 and in which the second connecting part 4 can be received in the illustrated manner so that it fits exactly and flush with the underside 1b.

The first connecting part 3 which is to be fixed on the upper end face 2a of the table leg 2 has several clamp bolts 7 which project vertically upwards, being constructed at their upper free ends with heads 7a, and are arranged symmetrically with respect to one another, preferably four of them distributed evenly in the corners of an imaginary square. These clamp bolt heads 7a are preferably in the shape of a spherical segment, and immediately below each head 7a an annular groove 7b is provided, the width of which (viewed in the axial direction of the clamp bolt) corresponds to the material thickness Md of the clamp closure plate 6. Since it is further preferred for the head 7a and the greatest shank portion 7c of each clamp bolt 7 remaining beside the groove 7b to be provided with the same external diameter D, the radial depth of the groove 7b immediately below each clamp bolt head 7a produces a part-section with a reduced diameter d, the significance of which will be dealt with in greater detail below.

Basically, each table leg 2 can be constructed in any way desired from solid material, e.g. wood, or from suitable crude sections (metal, particularly aluminium sections), and in this case the first connecting part 3 of the connecting arrangement is adapted to correspond to this leg, being fixed on the end face at the upper end of the leg 2a. In the illustrated embodiment it may be assumed and preferred that the table legs 2 are constructed in the form of a hollow section with a substantially rectangular, preferably square cross-section and these hollow sections take the form of such a metal section, particularly an aluminium section (as indicated in FIG. 2). In adaptation to this construction of the table legs 2 it is then particularly advantageous if the first connecting part 3 of the connecting arrangement contains an insert part 8 which is adapted in its external dimensions to the internal dimensions of the table leg section, has a sufficient height and is preferably fixed in this upper end 2a of the table leg with a press fit. In this case—as can be seen in FIGS. 1 and 2—this insert part 8 has an upper shoulder rim 8a which is widened by approximately the material thickness of the table leg section and is intended for support on the upper edge of the table leg section, and four axially or vertically extending bores are provided in this insert part 8 in such a distribution that the clamp bolts 7 already mentioned above are firmly received in them; these clamp bolts merely project in the necessary manner out of the upper face 8c of this insert part 8 sufficiently far to permit the desired connection to be reliably produced between the first connecting part 3 and the second connecting part 4.

The end plate 5 of the second connecting part, which is fixed, preferably screwed, onto the underside 1b of the table plate 1 has four bores 9 which are adapted to the size, number and distribution of the clamp bolts 7 and the clamp bolt heads 7a, i.e. these bores are thus also arranged so that they are evenly distributed in the four corners of an imaginary square, the same distances apart as the clamp bolts 7, and the diameter of these bores 9 is only slightly greater than the external diameter D of the clamp bolts 7 and their heads 7a so that these clamp bolts can be inserted from below into the bores 9 so that they fit quite accurately.

The clamp closure plate 6 which lies flat directly on this end plate 5 can be rotated to a limited extent relative to the end plate 5 about a vertical axis of rotation 10 between a first release position and a second locking position. As can be seen in FIG. 3, the clamp closure plate 6 is of essentially circular construction, and it has a lever arm 11 which is formed integrally on one peripheral section and is directed away from the axis of rotation 10 for its rotary actuation in the direction of the double arrow 12. A downwardly projecting knob 13 is fixed on this lever arm 11 of the clamp closure plate 6, and in the assembled state of this second connecting part 4 this knob projects sufficiently far to below the plane of the underside 1b of the table plate.

It can be seen particularly well in FIG. 3 that four receiving holes 14 which are adapted in their distribution to the clamp bolts 7 of the first connecting part are made in the peripheral region of this clamp closure plate 6 in the region above the bores 9 of the end plate 5 and are shaped like latches in such a way that in the release position of the clamp closure plate 6 at least some of the clamp bolt heads 7a of the first connecting part 3 can be freely introduced into these receiving holes 14 (and can be freely withdrawn) and that in the locking position of the clamp closure plate 6 (solid line in FIG. 3) the clamp bolt heads 7a inserted into these receiving holes 14 are gripped by this clamp closure plate and are locked by firm clamping of the first connecting part with the second connecting part 4.

In order on the one hand to be able to facilitate the free insertion or the free withdrawal of the clamp bolt heads 7a in the receiving holes 14 and on the other hand the aforementioned reliable gripping and clamping of the clamp bolt heads 7a with the aid of the clamp closure plate 6, the receiving holes 14 each have a widened first section 14a and a narrower second section 14b. As shown in FIG. 3, each widened first hole section 14a is adapted to the diameter of the clamp bolt heads 7a so that in each case a clamp bolt head 7a can just be freely inserted into or withdrawn from this first hole section 14a. On the other hand the narrower second hole sections 14b of the receiving holes 14 are constructed as circular slots which are centered on the axis of rotation 10, have a width W which remains substantially the same over their curved length and each open at one end into the appertaining widened first hole section 14a, the slot width W being adapted to the diameter d of the clamp bolt shank reduced by the groove 7b immediately below the particular clamp bolt head 7a.

As is further shown with the aid of FIGS. 3 and 4, these slot-shaped second hole sections 14b are defined laterally by regions of the closure plate in the form of inclined surfaces, namely in each case an inner inclined surface 15a and an outer inclined surface 15b, which each rise evenly from the appertaining widened hole section 14a as far as the region of the opposite end of the slot, i.e. preferably until just before this end of the slot (cf. FIG. 4), and in the locking position of the clamp closure plate 6 the inclined surfaces 15a, 15b which define the second hole sections 14b engage under the clamp bolt heads 7a inserted into the first hole sections 14a, as can be seen in FIGS. 2 and 4. Since the clamp bolt heads 7a and the remaining shank portion 7c of each clamp bolt 7 have the same diameter D and the size of the bores 9 provided in the end plate 5 is adapted to this diameter D, the uppermost end of each clamp bolt 7 having the head 7a and the groove 7b is fixed stably and reliably in or on the clamp closure plate 6 and the upper end of the shank portion 7c immediately adjoining it is stably and reliably fixed in the appertaining bore 9 in the end plate 5 when the first connecting part 3 is clamped with the second connecting part 4 in the locking position of the clamp closure plate 6 (FIGS. 2 and 3). This reliable clamping of the two connecting parts 3 and 4 is further assisted by the fact that the dimension by which the lower edges of the clamp bolt heads 7a project upwards from the upper face of the first clamp closure part 3 or its insert part 8 (as can be seen in FIG. 2) corresponds to the combined thickness of the end plate 5 and the clamp closure plate 6 connected thereto (placed flat upon it).

As already mentioned above, the second connecting part 4 is fixed in the groove 1c provided on the underside 1b of the table plate 1 in that the end plate 5, which to some extent serves simultaneously as a window cover plate, is screwed to the table plate 1 by means of several wood screws 16, as indicated in FIGS. 1 and 2. In this case the axis of rotation about which the clamp closure plate is capable of limited rotary movement relative to the end plate 5 is preferably formed by a journal 10 which is fixed in the end plate 5 in the manner illustrated in FIG. 2 and engages through a suitable central bearing bore 17 in the clamp closure plate 6. In this case the clamp closure plate 6 can be oriented with respect to the end plate 5 and reliably fixed by releasable fixing of a circlip 18 on the upper free cylindrical end of the journal 10 which is constructed for example with a flat lower head.

A circular slot-like cut-out 19 through which the knob 13 of the closure plate lever arm 11 projects freely downwards is also provided in the end plate 5, and the ends of the cut-out 19 form end stops 19a or 19b for this knob 13 in such a way that one end stop, e.g. the end stop 19a, determines the release position of the clamp closure plate 6 and the other end stop, e.g. 19b, determines the locking position when the knob 13 or the appertaining closure plate lever arm 11 rests against the corresponding end stop 19a or 19b.

It is also advantageous if a shield plate 20 which is preferably circular and is fixed on the underside of the table plate 1 (inside the cut-out 1c) and is somewhat larger than the slot-shaped cut-out 19 is provided above the clamp closure plate 6 and covers the slot-shaped cut-out 19 in the end plate 5 in the manner of a window shield, as indicated in FIG. 2. This shield plate 20 has guide projections 20a on its underside facing the clamp closure plate 6, and these guide projections also extend approximately in a circular fashion with the clamp closure plate 6 supported with its upper face against them, thus providing additional secure guiding and support of the clamp closure plate 6 during its rotary movement in the direction of the double arrow 12.

Since in this connecting arrangement the four clamp bolts 7 are fixed in the four corners of an imaginary square so that they are evenly distributed on the first connecting part and the four bores 9 in the end plate 5 and the four receiving holes 14 in the clamp closure plate 6 are disposed in a matching square arrangement, quite especially good prerequisites are produced for clamping the table legs 2, each firmly connected at its upper end to a first connecting part 3, firmly and reliably to the underside of a table plate 1 so that they are releasable and replaceable at any time, using the second connecting parts 4 of the connecting arrangement which are preferably fixed there in the corner regions.

If in this connection it is assumed that one table leg is to be releasably fixed in each of the four corner regions of one single table plate 1 in the manner which can be seen in particular from FIGS. 1 and 2, then first of all in each corner region 1a of the table plate the clamp closure plate 6 of the second connecting part 4 is turned (or swivelled or pushed) into the release position with the aid of the knob 13 and the appertaining lever arm 11 according to the double arrow 12. Then the table leg 2 belonging to one corner region 1a of the table plate 1—corresponding to the illustration in FIG. 1—is moved in the direction of the arrow 21 and towards the underside 1b of the table plate 1 so that each of the four clamp bolt heads 7a is inserted from below first of all through an appertaining bore 9 in the end plate 5 and then through an appertaining widened first hole section 14a of the receiving bores 14 lying directly above it so that it passes upwards into the second connecting part 4 until the upper face of the inset part 8 butts flush against the underside of the end plate 5. The clamp closure plate 6 is then rotated in the direction of the double arrow 12 into its locking position by actuation of the lever arm 11 by means of the knob 13, so that the narrower second hole sections 14a of the receiving holes 14 engage in the grooves 7b immediately below the clamp bolt heads 7a, so that the inclined surfaces 15a and 15b engage laterally below the second hole sections 14b and the clamp bolts 7 together with the insert body 8 and the table leg 2 fixed thereon are thereby also drawn firmly into the bores 9 and against the underside of the end plate 5 of the second connecting part 5 and thus reliably clamp the two connecting parts 3 and 4 and with them the table plate 1 to the table leg 2, as illustrated in FIG. 2.

Since, as already mentioned, the four clamp bolts 7 are evenly distributed in the four corners of an imaginary square, two clamp bolts 7 which belong together in a pair and have clamp bolt heads 7a (cf. also FIG. 3) are located on each side of the square, and accordingly in the same way the bores 9 with the receiving holes 14 lying above them are also suitably distributed and arranged in the second connecting part 4. In this case two bores 9 belonging as a pair to one side of the square with appertaining receiving holes 14 advantageously lie near and parallel to one edge of the table plate 1. Thus if, as can be seen largely from FIG. 3, the second connecting part 4 is arranged in the corner region 1a of the table plate 1 in such a way that a pair of bores 9 belonging to one side of the square with appertaining receiving holes 14 is co-ordinated with one table edge 1d of the corner region 1a and a second pair of bores 9/receiving holes 14 belonging to a second side of the square lying adjacent at right angles is co-ordinated with the adjacent edge 1e of the corner region 1a lying at right angles, then by means of its first connecting part 3 which is fixed thereon the upper end 2a of the table leg 2 can be arranged accurately to fit in this corner region 1a so that they can be removed without problems. In this case the arrangement can be such that the outer faces of the table leg lie flush or almost flush (depending upon the requirements) with the corresponding outer edges 1d, 1e of the corner region 1a of the table plate.

Figure 5:
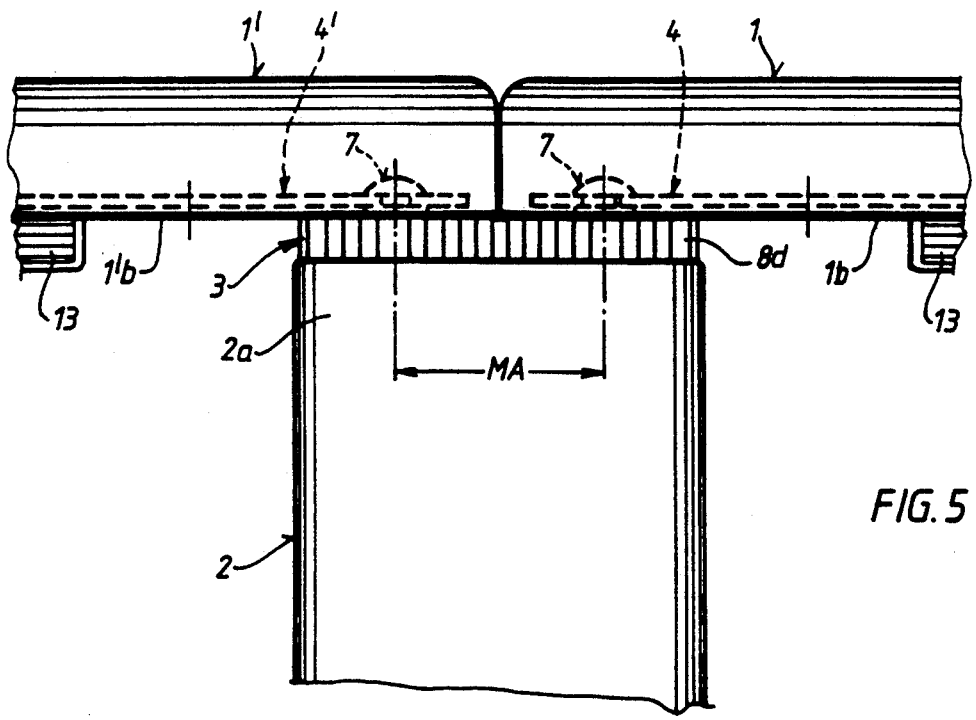
FIG. 5 shows a partial view of a table assembled from at least two table plates in the region of the abutment point between the two table plates and a table leg connected together with these two table plates by the connecting arrangement.

With the co-ordination and construction explained above it is also particularly advantageous if—as indicated in FIG. 5—in the case of a possible means of assembly of a table from at least two table plates 1, 1' which butt flush against one another with their opposite edges with table legs 2 to be arranged below their corner regions a second connecting part 4, 4' is fixed in each case on the underside 1b or 1'b of each corner region of the table plates 1, 1' in the same manner as explained above. In this case the pair of bores 9/receiving holes 14 in the second connecting part 4 of the first table plate 1 have a centre-to-centre distance MA from the opposing pair of bores 9/14 in the second connecting part 4' of the adjacent other table plate 1' which corresponds exactly to the centre-to-centre distance MS of two adjacent clamp bolts (cf. FIG. 2) of a table leg 2 in such a way that two clamp bolts 7 of the first connecting part 3 can be releasably clamped in the second connecting part 4 on the corner region of the first table plate 1 and the two other clamp bolts 7 of this first connecting part 3 can be releasably clamped in the second connecting part 4' on the corner region of the second table plate 1'. In order to achieve this all that is necessary is a correspondingly accurate arrangement of the second connecting parts 4, 4' in the corner regions of each table plate 1, 1' etc., whilst the construction and design of all first and second connecting parts 3, 4, 4' etc. can be exactly the same. Thus a table leg 2 can be used as required with only one single corner region of one single table plate or also—with exactly the same construction—for supporting and clamping with at least two corner regions of two table plates which butt flush against one another. Accordingly if a number of table plates which are of the same construction and are provided on their corner regions with the same second connecting parts 4 are provided as well as a number of table legs 2 constructed in the aforementioned manner with first connecting parts 3, then a table of any size can be assembled, i.e. either with only one single table plate or with a number of table plates adapted to the particular requirements in order for example to put together a larger conference table. For example, if one imagines a table plate with basic dimensions of 90×180 cm, then with the aid of these table plates and the table legs 2 tables of any size can be reliably and firmly assembled to some extent in a modular fashion, and this assembly and any alteration can be carried out extremely quickly and an extremely stable construction is always ensured.

In the connecting arrangement according to the invention it is also possible simultaneously to achieve particularly favourable optical effects if required if—as indicated in FIGS. 1 and 5—the upper end of the insert part 8 which projects out of the upper end 2a of the table leg 2 and has the shoulder rim 8a has an appropriately adapted and desired external profile 8d.

The individual elements of the two connecting parts 3 and 4 can be made in each case from the most suitable materials, particularly metal and plastic. For instance, a plastic material which permits production by casting is particularly suitable for example for the production of the insert part 8 of the first connecting part, whilst the clamp bolts 7 fixed therein are preferably steel bolts. On the other hand the end plate 5 and the clamp closure plate 6 can preferably be made from metal, particularly sheet steel and/or aluminium sheet.

I claim:

1. Connecting arrangement between an upper end of a table leg and at least one table plate for assembly of a table, characterized by a releasable and lockable construction with the following features:

a) a first connecting part which is fixed on an upper end face of the table leg and has several clamp bolts arranged symmetrically with respect to one another and projecting vertically upwards with heads constructed on their free ends;

b) a second connecting part which is coordinated with the table plate and which comprises an end plate which can be fixed on an underside of the table plate with several bores adapted in their size, number and distribution to receive the clamp bolts and clamp bolt heads of the first connecting part as well as a clamp closure plate that is of essentially circular construction and has a lever arm and which is arranged flat on the end plate, is capable of limited rotary movement relative to the end plate about a vertical axis between a release position and a locking position and wherein the lever arm is formed integrally on one peripheral section of the circular portion of the clamp closure plate and is directed away from the axis of rotation for the rotary actuation of the clamp closure plate and has a downwardly projecting knob and a circular slot-like cut-out through which the knob of the closure plate lever arm projects freely downwards is provided in the end plate, and the ends of the cut-out form end stops for the knob in such a way that the end stops determine on the one hand the release position and on the other hand the locking position of the clamp closure plate, and the clamp closure plate has on its periphery several receiving holes which are provided in a region above the bores in the end plate and are shaped like catches in such a way that in the release position of the clamp closure plate at least some clamp bolt heads of the first connecting part can be freely inserted into these receiving holes and in the locking position of the clamp closure plate the clamp bolt heads inserted into these receiving holes are gripped by the clamp closure plate and are locked by firm clamping of the first connecting part with the second connecting part.

2. Connecting arrangement as claimed in claim 1, characterized in that a shield plate is provided above the clamp closure plate which is preferably circular and can be fixed on the underside of the table plate and which covers the slot-shaped cut-out in the end plate in the manner of a window shield and which has on its underside facing the clamp closure plate guide projections against which the clamp closure plate is supported with its upper face.

3. Connecting arrangement as claimed in claim 1, characterized in that the axis of rotation of the clamp closure plate is formed by a journal which is fixed in the end plate and engages through a central bearing bore in the clamp closure plate.

4. Connecting arrangement as claimed in claim 1, characterized in that the receiving holes in the clamp closure plate each have a first hole section adapted to the diameter of the clamp bolt heads and a narrower second hole section, and these second hole sections are constructed as circular slots which are centered on the axis of rotation and have a width which remains substantially the same over their length and is adapted to the diameter of the clamp bolt shank sections lying immediately below the clamp bolt heads, so that these circular slots each open at one end into the appertaining widened first hole section and are defined laterally by regions of the closure plate in the form of inclined surfaces which in each case rise evenly from the appertaining first hole section as far as the region of the opposite end of the slot, so that during actuation into the locking position of the clamp closure plate the inclined surfaces which define these second hold sections engage under the clamp bolt heads inserted into the first hole sections to clamp them firmly.

5. Connecting arrangement as claimed in claim 4, characterized in that the heads at the free ends of the clamp bolts are in the shape of a spherical segment and the clamp bolt shank sections immediately below each head have an annular groove running round them, the width of the groove corresponding to the material thickness of the clamp closure plate and the depth of the groove being such that the clamp bolt diameter which is reduced in the region of this groove is adapted to the slot width of the second hole sections in the clamp closure plate, and the heads and the remaining shank portion of each clamp bolt have a diameter of the same size and the bores provided in the edge plate are adapted in size to this diameter.

6. Connecting arrangement as claimed in claim 5, characterized in that the dimension by which the lower edge of the clamp bolt heads project upwards from the upper face of the first connecting part corresponds to the combined thickness of the end plates and clamp closure plates which are connected to one another.

7. Connecting arrangement as claimed in claim 1, characterized in that four clamp bolts are fixed on the first connecting part so that they are evenly distributed in the four corners of an imaginary square, and in a corresponding square distribution four bores are arranged in the end plate and four receiving holes in the clamp closure plate, so that at least two bores and two receiving holes belonging as a pair to one side of the square lie near and parallel to one edge of the table plate.

8. Connecting arrangement as claimed in claim 1, characterized in that the second connecting part is attached to the table plate in the corner region of the table plate and has first pair of bores and receiving holes belonging to one side of the square that are coordinated with one edge of the corner region of the table plate and a second pair of bores and receiving holes belonging to a second side of the square lying adjacent to and at right angles to the first pair of bores and receiving holes that are coordinated with the adjacent edge of the corner region of the table plate.

9. Connecting arrangement as claimed in claim 8, in which at least two table plates which butt flush against one another with their opposite edges can be assembled with table legs which are to be arranged below their corner regions to form a table, characterized in that a second connecting part is fixed on the underside of each corner region of the table plates in such a way that the pair of bores and receiving holes in the second connecting part of the first table plate have a center-to-center distance from the opposing pair of bores and receiving holes in the second connecting part of the adjacent other table plate which corresponds exactly to the center-to-center distance of the two adjacent clamp bolts on the first connecting part of a table leg in such a way that two clamp bolts of the first connecting part can be releasably clamped in the second connecting part on the corner region of the first table plate and the two other clamp bolts of this first connecting part can be releasably clamped in the second connecting part on the corner region of the other table by one and the same table leg.

10. Connecting arrangement between an upper end of a table leg and at least one table plate for the assembly of a table, characterized by a releasable and lockable construction with the following features:
 a) a first connecting part which is fixed on an upper end face of the table leg and has several clamp bolts arranged symmetrically with respect to one another and projecting vertically upwards with heads constructed on their free ends;

b) a second connecting part which is coordinated with the table plate and which comprises an end plate which can be fixed on an underside of the table plate with several bores adapted in their size, number and distribution to receive the clamp bolts and clamp bolt heads of the first connecting part as well as a clamp closure plate which is arranged flat on the end plate, is capable of limited rotary movement relative to the end plate about a vertical axis between a release position and a locking position, and has on its periphery several receiving holes which are provided in the region above the bores in the end plate and are shaped like catches in such a way that in the release position of the clamp closure plate at lease some clamp bolt heads of the first connecting part can be freely inserted into these receiving holes and in the locking position of the clamp closure plate the clamp bolt heads inserted into these receiving holes are gripped by the clamp closure plate and are locked by firm clamping of the first connecting part with the second connecting part and wherein each connecting arrangement table leg is in the form of a hollow section with a substantially rectangular cross-section, preferably in the form of such a metal section, are provided, the first connecting part includes an insert part which is fixed in the upper end of the table leg with a press fit and which has an upper shoulder rim which is widened by approximately the material thickness of the table leg section and is intended for support on the upper edge of the table leg section, and vertically extending bores, in which the clamp bolts are firmly received in the insert part.

* * * * *